United States Patent [19]
Harrison

[11] 3,844,112
[45] Oct. 29, 1974

[54] GAS TURBINE START-UP FUEL CONTROL SYSTEM
[75] Inventor: Emmett S. Harrison, Corona, N.Y.
[73] Assignee: Curtiss-Wright Corporation, Woodridge, N.J.
[22] Filed: June 27, 1973
[21] Appl. No.: 373,964

[52] U.S. Cl. .............................................. 60/39.14
[51] Int. Cl. ............................................... F02c 7/26
[58] Field of Search .................................... 60/39.14

[56] References Cited
UNITED STATES PATENTS

| | | | |
|---|---|---|---|
| 2,847,824 | 8/1958 | Best et al. ........................... | 60/39.14 |
| 3,420,056 | 1/1969 | Eames .............................. | 60/39.28 R |
| 3,469,395 | 9/1969 | Spitsbergen et al. ................ | 60/39.14 |
| 3,520,133 | 7/1970 | Loft et al. ......................... | 60/39.14 |

Primary Examiner—Carlton R. Croyle
Assistant Examiner—O. T. Sessions
Attorney, Agent, or Firm—Arthur L. Frederick

[57] ABSTRACT

The gas turbine start-up fuel control system provides for a characterizer which is programmed to provide a desired sequential acceleration of the engine in accordance with a signal representing corrected compressor speed. The characterizer functions also to effecting, through a current-to-pressure controller, flow of pressurized fluid, simulating compressor outlet pressure, to a compressor inlet temperature sensor, the latter, in turn, controlling the position of a fuel control valve in relation to compressor inlet temperatures through a servo-valve mechanism.

5 Claims, 2 Drawing Figures

[3,844,112]

GAS TURBINE START-UP FUEL CONTROL SYSTEM

This invention relates to gas turbine control systems and, more particularly, to a control system for effecting start-up of a gas turbine engine.

BACKGROUND OF INVENTION

In stationary industrial gas turbine installations, particularly those installations for the generation of electricity for peak loading periods, it is necessary to provide an automatic means for effecting start-up of the gas turbine engine. It is to be understood that by start-up is meant that phase of engine operation between light-off or ignition and idle where engine operation is self-sustaining and is at a minimum preselected rpm at which it produces a compressed air pressure of a value sufficient to provide a control signal. One of the problems in such systems is that the fuel control valve has to be contoured (designed) to match the fuel flow requirements as predetermined by a scheduled start-up procedure. This contouring must also consider the individual engine characteristics, place of use (environmental factors) and characteristics of the fuel (i.e., heating value). Also, the fact that the compressor produces, at low angular velocity, an insufficient outlet fluid pressure to provide an effective control signal, complex means have been necessary to insure engine acceleration as required by the scheduled start-up procedure.

Accordingly, it is an object of this invention to provide a start-up control system for a gas turbine engine which provides a predetermined fuel flow to insure continuous acceleration of the engine up to a predetermined idling angular velocity of the engine.

It is another object of the present invention to provide a start-up control system for a gas turbine engine, which system is relatively simple and inexpensive and which does not require an especially designed fuel control valve.

A further object of this invention is to provide a start-up control system for a gas turbine engine, which system is capable of application to any specific engine, atmospheric operating conditions and kind of fuel employed, by a relatively simple adjustment.

A still further object of the present invention is to provide a start-up control system for a gas turbine engine, which system overcomes the inherent low pressure produced by the engine air compressor at low angular velocities such as are present during start-up of the engine.

SUMMARY OF THE INVENTION

Now, therefore, the invention contemplates a start-up control system which comprises a biasing and signal generating means which is connected through a three-way valve to a means for simulating compressor discharge pressure, including a schedule circuit or characterizer, and, in another position of the valve, is connected to a running regime circuit. The biasing and signal generating means is connected to a fuel flow control valve which functions to control flow of fuel from a source thereof to the combustor of the engine.

The running regime circuit may comprise compressed air discharge pressure sensing means and compressor inlet air temperature sensing means, each of which produces a signal that is conducted to the biasing and signal generating means. The biasing and signal generating means functions to emit a signal to effect operation and adjustment of the fuel flow control valve. The running regime circuit may also be of the type disclosed in U.S. Pat. application Ser. No. 340,963, filed Mar. 13, 1973, and assigned to the same assignee as this application.

The means for simulating compressor discharge pressure comprises a source of pressurized fluid, such as nitrogen, connected to a pressure converter through a pressure regulator, the pressure converter being connected through the three-way valve to the biasing and signal generating means. In accordance with this invention, the pressure converter is controlled by the characterizer so that pressurized fluid in amounts required to provide the programmed acceleration of the engine is passed to the biasing and signal generating means wherein an output signal corrected in accordance with compressor air inlet temperature is generated. The output signal is conducted to the fuel flow control valve which may be of the servo regulated type, the valve controlling the flow of fuel in the required amounts to the combustors of the engine.

BRIEF DESCRIPTION OF THE DRAWINGS

The invention will be more fully understood from the following description when considered in connection with the accompanying drawings in which.

DESCRIPTION OF PREFERRED EMBODIMENT

Figure 1:
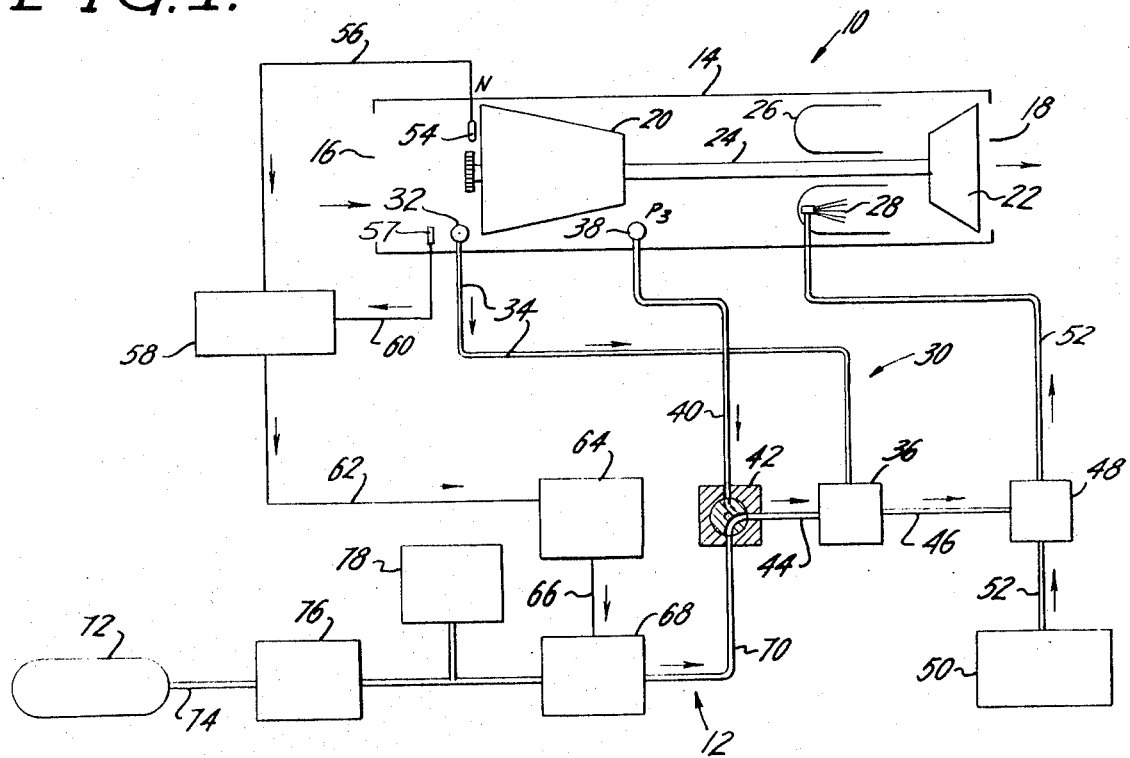
FIG. 1 is a schematic illustration of a gas turbine engine having a start-up control system according to this invention.

Now referring to the drawings and, more specifically, FIG. 1, the reference number 10 generally designates a gas turbine engine which is provided with a start-up control system 12 according to this invention. The gas turbine engine is shown as a single spool type engine, but the invention is not limited to such application and may be employed in other types of gas turbine engines, such as multi-spool types, without departure from the scope and spirit of this invention. As shown, gas turbine 10 comprises a housing 14 which has an air inlet opening 16, at one end, and an exhaust gas outlet opening 18 at the opposite end. Within the housing is a compressor assembly 20 which is driven by a turbine assembly 22 through a shaft 24. A combustor assembly 26 is disposed between compressor assembly 20 and turbine assembly 22 and is connected to receive compressed air from compressor assembly 20 and to pass combustion products or exhaust gases into the turbine assembly 22, thereby rotatively driving the latter. In an industrial gas turbine installation, exhaust gas outlet 18 is connected to a turbine (not shown) to rotatively drive the latter which in turn, drives an apparatus (not shown), such as an electrical generator. To regulate the start-up operation of the engine by controlling the rate of combustion in combustor 26, start-up control system 12 functions to control flow of fuel to fuel injectors or burners 28 during the period between light-off or ignition and a self-sustaining engine operation at a preselected minimum angular velocity at which compressor assembly 20 provides compressed air at a pressure level suitable for engine operation and control purposes, hereinafter referred to as "idling operation." To control engine operations at angular velocities in excess of the angular velocity of idling state operation, a running regime circuit 30 is provided.

The running regime circuit 30 may comprise any suitable system for controlling engine operation above idle, such as exemplified in the U.S. Pat. to Wintrode, No. 2,971,337; Sanders, U.S. Pat. No. 2,974,483; 483; and Loft et al. U.S. Pat. No. 3,520,133, or may comprise the system depicted in FIG. 1. As shown in FIG. 1, running regime 30 comprises an ambient (inlet) air temperature sensor 32, which may be in the form of a thermo-bellows type, disposed in air inlet opening 16 of engine 10. The air temperature sensor 32 produces a fluid pressure signal which is proportional to the temperature of the air flowing through inlet 16 and into compressor assembly 20. This signal is transmitted, by way of a line 34, to a biasing and signal generator 36 which also receives a compressed air pressure signal, $P_3$. This compressed air pressure is sensed at the outlet of compressor assembly 20 by one end 38 of a pipe 40. Of course, this transmission of air pressure, $P_3$, only occurs when a three-way valve 42 is in the position shown by the dotted line to communicate pipe 40 with a pipe 44, the pipe 44 interconnecting three-way valve 42 with a biasing and signal generating means 36 (hereinafter referred to as "compressor inlet temperature sensor"). The compressor inlet temperature sensor 36 is constructed and arranged to provide an output signal which represents compressor discharge pressure corrected in accordance with ambient air inlet temperatures. This output signal is transmitted, via a line 46, to a fuel flow control valve 48 which is constructed and arranged to regulate fuel flow, from a source of fuel 50, through a fuel supply pipe 52 to fuel injectors or burners 28. The fuel flow control valve 48 may be of the servo valve-limiter type manufactured by Woodward Governor Company of Fort Collins, Colorado and designated Part No. 40042.

Figure 2:
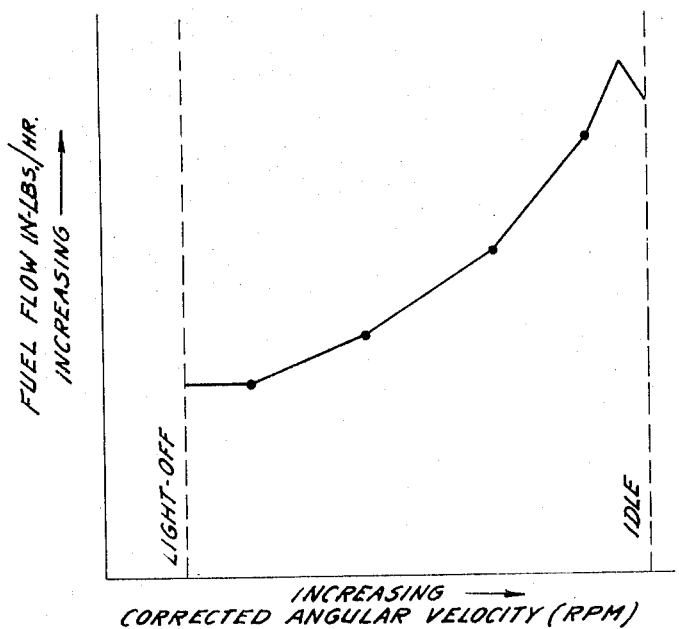
FIG. 2 is a graph illustrating a start-up schedule plotted in relation to corrected rotor velocity and rate of fuel flow.

The start-up control system 12, in addition to three-way valve 42, compressor inlet temperature sensor 36 and fuel flow control valve 48, comprises a circuitry means for simulating at compressor inlet temperature sensor 36 an air pressure, $P_3$, of predetermined values and at proper sequences to provide a desired increase in engine speed. This circuitry means comprises a sensor 54 for sensing the angular velocity or speed of compressor assembly 20, one such suitable device may be a tachometer generator or inductor-alternator which produces alternating electrical signals having a frequency or voltage which is proportional to the rotational speed of compressor assembly 20. These electrical signals are conducted, via a line 56, to a divider 58. An ambient air temperature signal is produced by a thermocouple sensor 57, which signal is conveyed via a line 60 to divider 58. The divider 58 may be a unit, designated model 66DT. manufactured by Foxboro Industries of Foxboro, Mass., which unit is constructed and arranged to effect a dividing function and produce an electrical output signal which is representative of a corrected compressor assembly speed. This speed output signal is conducted, via a line 62, to a characterizer 64. The characterizer 64 functions to shape the speed output signals to provide electrical control signals proportional to the flow areas of fuel control valve 48 required to produce the multi-step sequence of engine acceleration as graphically shown in FIG. 2. The characterizer 64 may be a signal characterizer, Model 66NT, style B, manufactured by Foxboro Industries of Foxboro, Mass. The electrical control signals generated by characterizer 64 is conducted by line 66 to a current-to-pressure converter 68 which may be of the type manufactured by Dynalco of Fort Lauderdale, Florida and designated type Model No. CT 2055. The pressure converter 68 functions in response to the electrical control signal emitted by characterizer 64 to provide a fluid pressure output proportional to such electrical control signal and thereby simulating a desired compressor output pressure, $P_3$. This fluid pressure is conducted to compressed air inlet temperature sensor 36, via pipe 70 three-way valve 42 and pipe 44, to effect a proper positioning of fuel flow control valve 48.

The fluid source of the simulated compressor outlet pressure may be, as shown, a container 72 holding a pressurized fluid, such as nitrogen, which container is connected to current-to-pressure converter 68 via a supply pipe 74. A pressure regulator 76 and a pressure relief valve 78 are connected to supply pipe 74.

The start-up control system 12 functions to initiate fuel flow by imposing a simulated compressor outlet pressure, $P_3$, on compressor inlet temperature sensor 36 with three-way valve 42 in the position shown. Also a self-starter (not shown) is energized to rotate shaft 24, compressor assembly 20 and turbine assembly 22. After light-off or ignition of fuel in combustor 26, characterizer 64 functions to produce an electrical control signal in response to corrected compressor speed signal conducted to the characterizer by line 62, which control signal causes current-to-pressure converter 68 to pass, through pipe 70, fluid of a pressure required to position fuel control valve 48 for a flow area necessary to effect the desired engine acceleration. When engine 10 reaches an idling angular velocity (see FIG. 2), at which point simulated compressor pressure reaches actual compressor outlet pressure $P_3$, three-way valve 42 automatically rotates to the dotted line position and thereby switches to the running regime control system 30 and terminates operation of the self-starter (not shown).

From the foregoing, it can be seen that, since the operation of the start-up control system 12 is governed solely by the programming (predetermined adjustment) of characterizer 64, and fuel control valve 48 can be of the conventional linear adjustable flow area type, the control system can be quickly and relatively easily adapted to the ambient atmospheric conditions of the place of installation, the heating value of the fuel employed, and the inherent operating characteristics of engine 10 by merely making appropriate adjustments of characterizer 64. Also, since fuel flow control valve 48 is not specifically matched to the particular engine, its place of use and fuel employed, fuel flow control valve 48 can be manually adjusted to a selected position when it is desired to override the start-up control system.

It is believed now readily apparent that the present invention provides a novel gas turbine start-up control system which has broad application and can be quickly and easily adapted for the peculiarities of a particular installation and with respect to the engine operating characteristics, fuel and ambient conditions of temperature and pressure. It is a control system which does not require a fuel flow control valve contoured (designed) to match the schedule of operation and particular engine. It is also a start-up control system which overcomes the lack of compressor discharge pressure at low angular velocities of the compressor which are encountered during engine start-up.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. A gas turbine engine start-up fuel control system for controlling fuel flow to a turbine engine having an air compressor assembly so as to effect engine acceleration at a preselected rate to the idling state of engine operation, the system comprises:
    a. a biasing and signal generating means for generating a signal which is a function of compressor discharge pressure biased by ambient air inlet temperature;
    b. means for sensing ambient air inlet temperature connected to the biasing and signal generating means to transmit a signal representative of the ambient air inlet temperature to said biasing and signal generating means;
    c. simulating means for simulating the compressor discharge pressure of the gas turbine engine and conducting a simulated pressure signal to said biasing and signal generating means; and
    d. fuel control valve means;
    e. said biasing and signal generating means being connected to a fuel flow control valve to effect adjustment of the fuel control valve;
    f. said simulating means, including a characterizer, for providing simulated pressure signals which are a function of compressor assembly angular velocity biased by ambient temperature and at predetermined sequential increments.

2. The apparatus of claim 1 wherein speed sensing means is provided to sense compressor assembly angular velocity and generate a signal proportional to such speed and a divider means connected to receive said speed signal and an ambient temperature signal, the divider constructed and arranged to produce an output signal representative of corrected compressor assembly speed and conduct such output signal to the characterizer.

3. The apparatus of claim 1 wherein a compressor outlet pressure sensing means, including a conduit means, is connected to said biasing and signal generating means to deliver a fluid pressure signal to the latter and wherein a valve means is provided for alternately connecting the compressor outlet pressure sensing means and the simulating means with said biasing and signal generating means.

4. The apparatus of claim 1 wherein said simulating means comprises a reservoir of pressurized fluid and a current-to-pressure converter which is connected to the characterizer and reservoir to respectively receive signals from the latter and fluid from said reservoir, said current-to-pressure converter functioning to control flow of simulated fluid pressure to said biasing and signal generating means.

5. The apparatus of claim 1 wherein said fuel flow control valve means is of the type where flow therethrough varies linearly relative to movement of the adjustable valve portion.

* * * * *